United States Patent
Lee

(10) Patent No.: US 7,224,579 B2
(45) Date of Patent: May 29, 2007

(54) REINFORCED SLIDE CHASSIS STRUCTURE OF AUDIO/VIDEO SYSTEM FOR A VEHICLE

(75) Inventor: Sang-Ho Lee, Seoul (KR)

(73) Assignee: Hyundai Autonet Co., Ltd., Icheon-shi (KR)

( * ) Notice: Subject to any disclaimer, the term of this patent is extended or adjusted under 35 U.S.C. 154(b) by 627 days.

(21) Appl. No.: 10/704,574

(22) Filed: Nov. 12, 2003

(65) Prior Publication Data

US 2005/0057499 A1   Mar. 17, 2005

(30) Foreign Application Priority Data

Sep. 15, 2003   (KR) .................... 10-2003-0063542

(51) Int. Cl.
  *G06F 1/16*   (2006.01)
  *H05K 5/00*   (2006.01)
(52) U.S. Cl. .................. 361/681; 701/476; 700/83
(58) Field of Classification Search ........ 361/679–687, 361/724–727; 701/1; 248/476, 27.1; 348/837, 348/836; 312/319.5–319.6; 700/83
See application file for complete search history.

(56) References Cited

U.S. PATENT DOCUMENTS

| 6,731,350 B2 * | 5/2004 | Endo et al. ................. 348/837 |
| 2005/0056733 A1 * | 3/2005 | Lee ............................ 248/27.1 |
| 2005/0071051 A1 * | 3/2005 | Leung ........................... 701/1 |

FOREIGN PATENT DOCUMENTS

| KR | 2000-0011042 | 6/2000 |
| KR | 2002-0006075 | 1/2002 |

* cited by examiner

*Primary Examiner*—Hung Van Duong
(74) *Attorney, Agent, or Firm*—Greenblum & Bernstein, P.L.C.

(57) ABSTRACT

The present invention relates to a reinforced slide chassis structure of an audio/video system, more particularly, to a reinforced slide chassis structure of an audio/video system for a motor vehicle, capable of preventing deteriorations in the slide chassis by reducing a total weight of the slide chassis yet reinforcing a deformation-sensitive portion of the slide chassis.

3 Claims, 5 Drawing Sheets

[FIG. 1] PRIOR ART
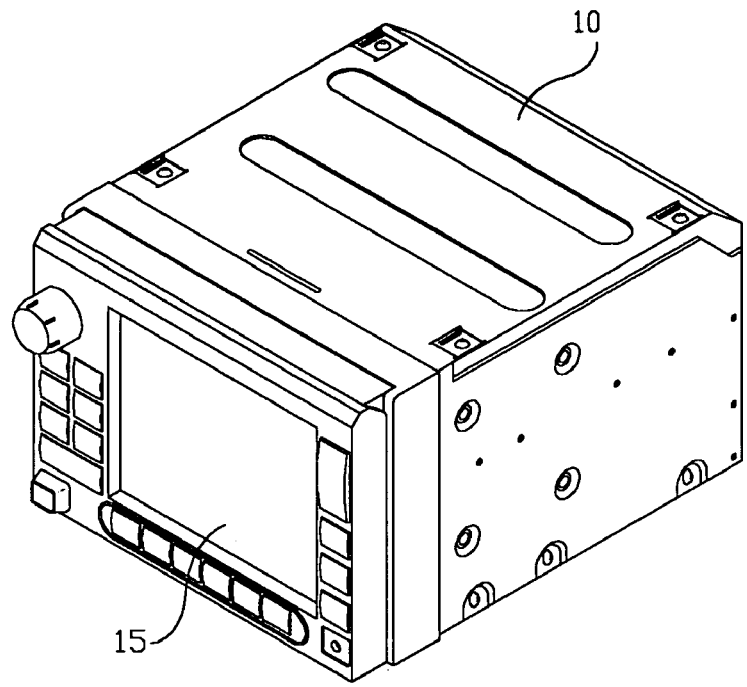
[FIG. 2] PRIOR ART
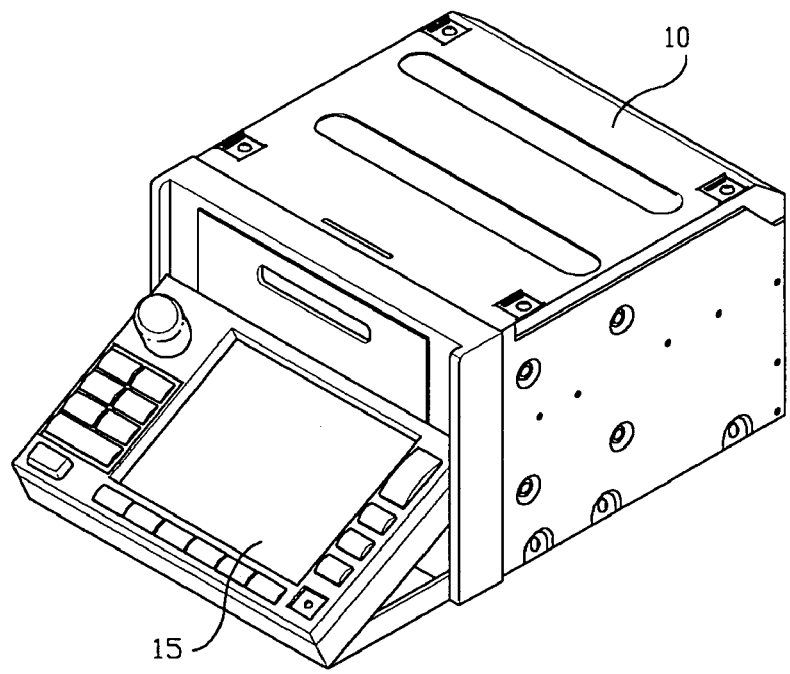

[FIG. 3] PRIOR ART
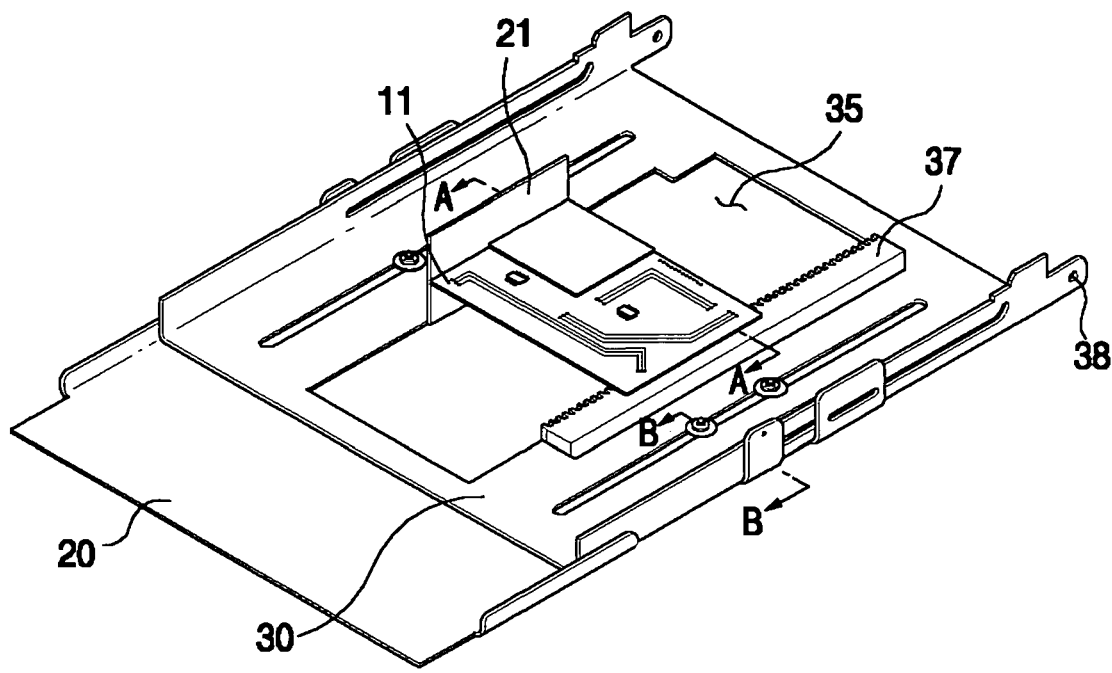
[FIG. 4] PRIOR ART
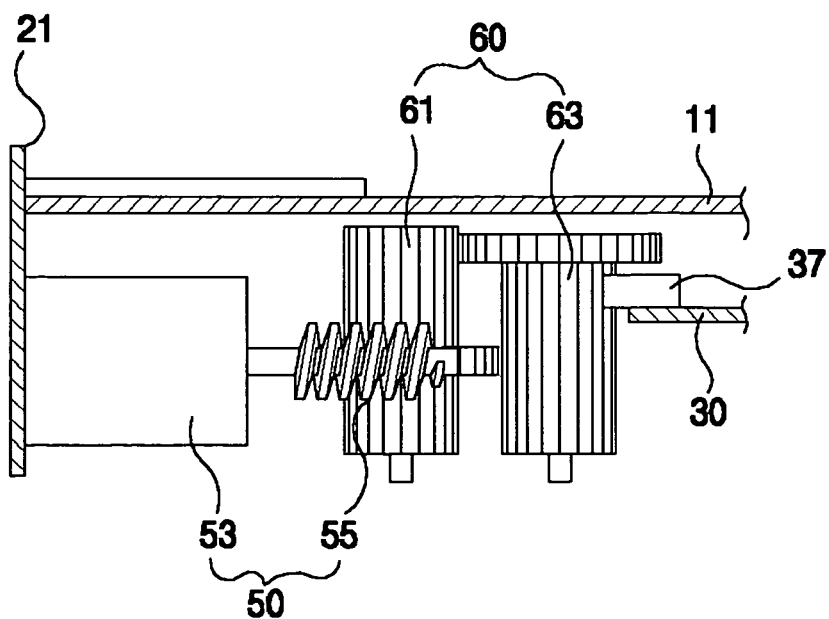

[FIG. 5] PRIOR ART
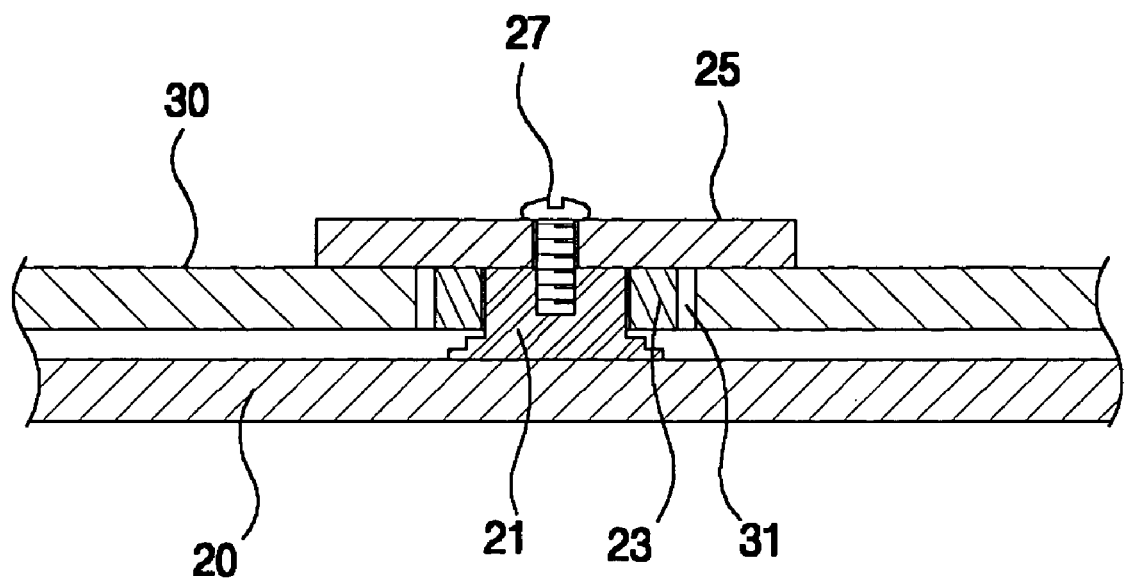

[FIG. 6]
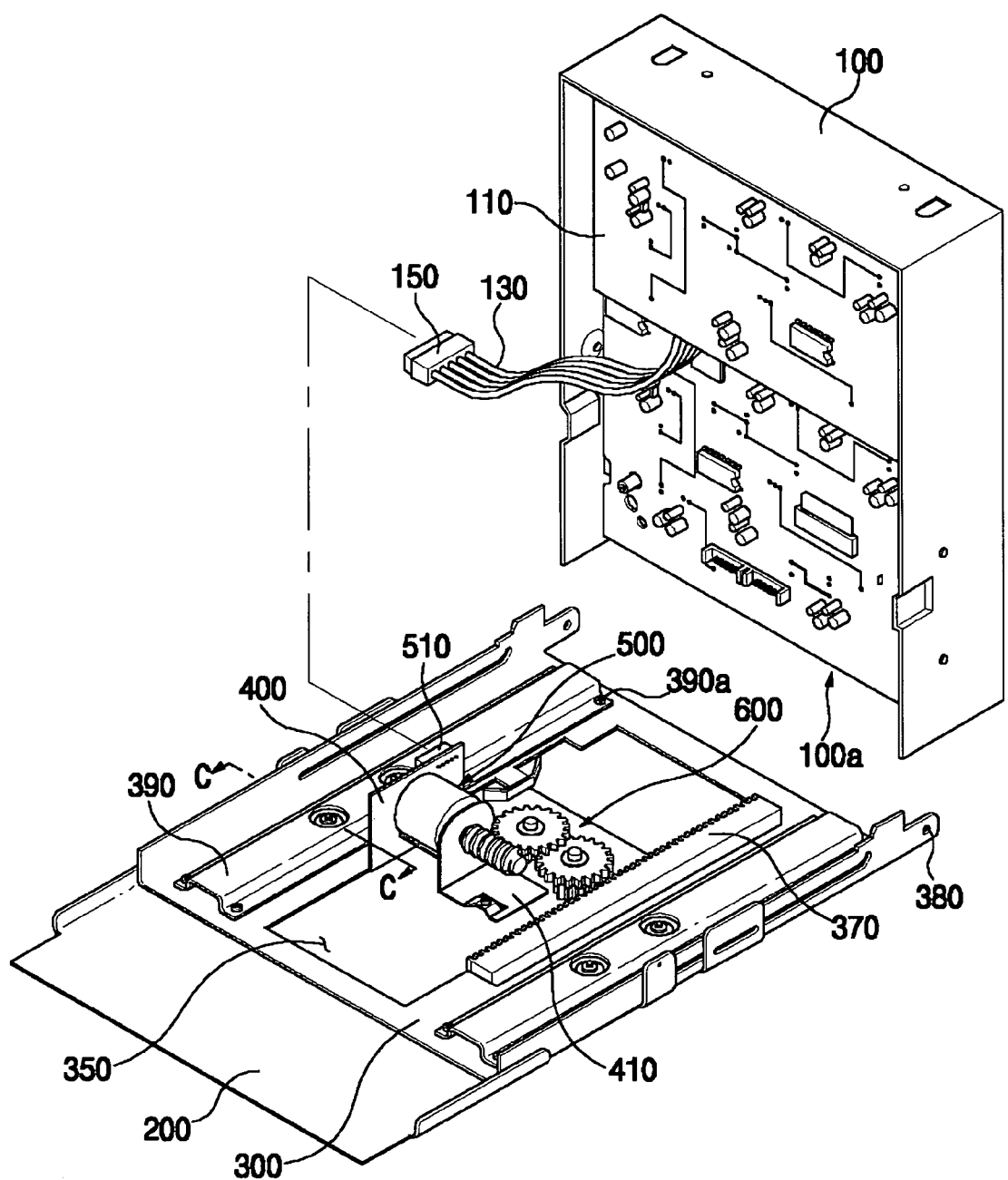

[FIG. 7]
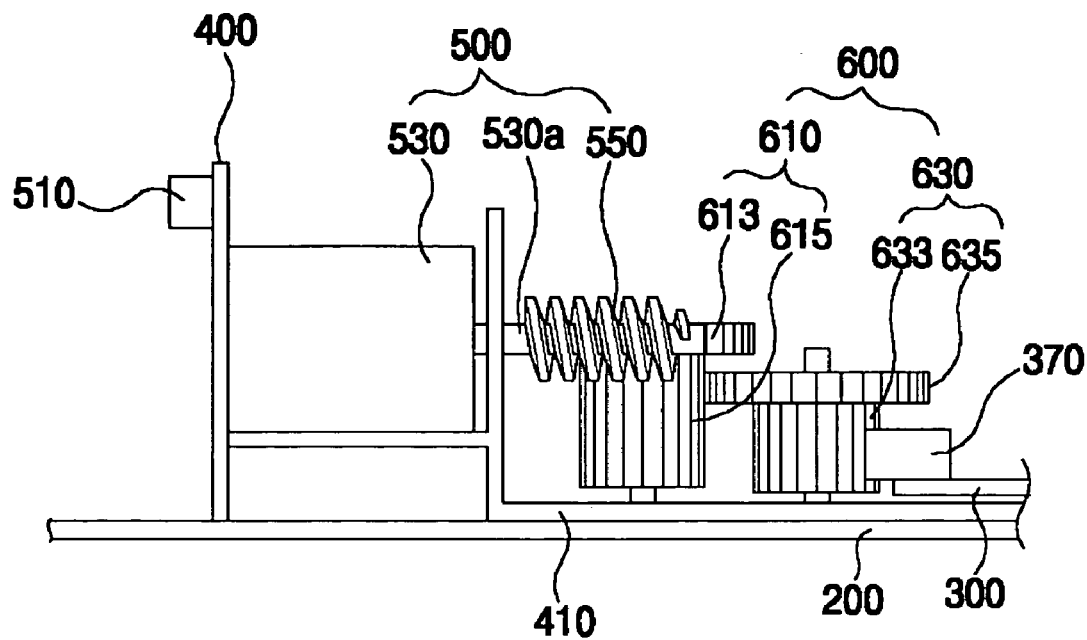
[FIG. 8]
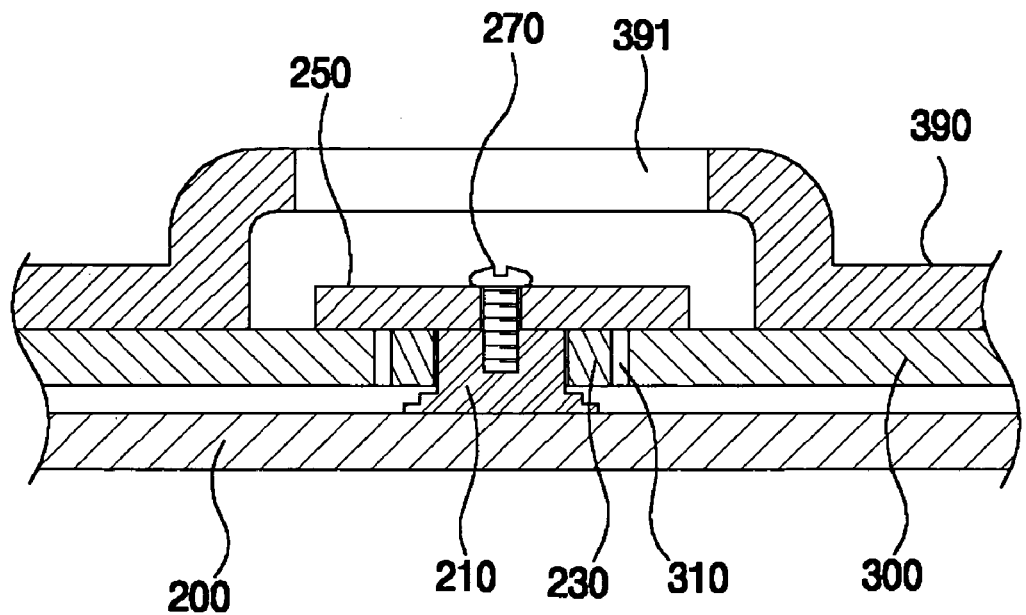

REINFORCED SLIDE CHASSIS STRUCTURE OF AUDIO/VIDEO SYSTEM FOR A VEHICLE

The present disclosure relates to subject matter contained in priority Korean Application No. 10-2003-0063542, filed on Sep. 15, 2003, which is herein expressly incorporated by reference in its entirety.

BACKGROUND OF THE INVENTION

1. Field of the Invention

The present invention relates to a reinforced slide chassis structure of an audio/video system, more particularly, to a reinforced slide chassis structure of an audio/video system for a vehicle, mounted with a reinforcing bracket formed in a direction of a long hole of the slide chassis.

2. Description of the Related Art

As more luxurious cars become popular among people, a variety of luxurious in-vehicle options are being introduced. Among the options are communication devices that provide drivers to access every kind of information, such as continually updated traffic information, road information, and map to a destination. One of typical examples is an audio/video system (hereinafter it is referred to as an 'AV system') for a vehicle mounted with a device for watching TV or an automatic navigation system.

In general, a front panel of such AV system forms a monitor, and a cassette player or compact disk player of a car audio is housed in the front panel. Therefore, when a driver wants to watch the monitor or change a cassette tape in the cassette player, the monitor is tilted at a designated angle.

An AV system comprising this type of monitor tilting apparatus was disclosed in Korean Patent Publication No. 2002-0006075 and Korean Utility Model Publication No. 2000-0011042.

An AV system with an existing monitor tilting apparatus is depicted in FIGS. 1 through 5. More specifically, FIG. 1 is a perspective view of a related art AV system with a monitor tilting apparatus, FIG. 2 is a perspective view of the monitor in FIG. 1, in which the monitor is being tilted, FIG. 3 is a perspective view of a low-surface chassis of FIG. 2, FIG. 4 is a cross-sectional view taken along line A—A in FIG. 3, and FIG. 5 is a cross-sectional view taken along line B—B in FIG. 3.

As shown in FIGS. 1 and 2, the AV system having an existing monitor tilting apparatus includes a main body 10 that is built in a cartridge of the body of a car. On a front surface of the main body 10 is a monitor 15, which is tiltable.

On the low-surface chassis 20 disposed at a lower end of the main body 10 is a slide chassis 30, as depicted in FIG. 3, through which the monitor 15 can move back and forth. At this time, a lower end of the monitor 15 is connected to a monitor mounting part 38 of the slide chassis 30.

Meanwhile, a long hole 35 is formed on the slide chassis 30 back and forth, enabling a motor part 50 and a back-and-forth motion member 60 to be mounted on the low-surface chassis 20. A support bar 21 is placed on the low-surface chassis around the hole 35 formed on the slide chassis 30, and a main printed circuit board 11 is mounted on the support bar 21, being inside out. As shown in FIG. 4, on the support bar 21 is the motor part 50 including a motor 53 and a worm 55. The main printed circuit board 11 has a plurality of control means for the motor part 50. The worm 55 of the motor part 50 is engaged (or meshed) with a wormwheel 61, and the wormwheel 61 is engaged with a wheel 63. Shafts of the wheel 63 and the wormwheel 61 are mounted on the low-surface chassis 20. The wheel 63 is again engaged with a rack gear part 37 of the slide chassis 30.

As shown in FIG. 5, there is a plurality of guide shafts 21 fixed on the right and left sides of the low-surface chassis, and guide rollers 23 are positioned centering around the guide shafts 21. Also, long holes 31 are formed on the slide chassis 30 centering around the guide rollers 23 in such a manner that when the slide chassis 30 moves, the long holes 31 move back and forth with respect to the guide rollers 23. In short, the guide rollers 23, as their name implies, play as a guide for the slide chassis 30.

However, the AV system with the above monitor tilting apparatus poses a problem.

For instance, the long hole 31 of the slide chassis 30 is easily deformed or twisted in spite of using a 1.2 mm-thick material to prevent vibration and deformation of the slide chassis 30.

This deformation of the long hole 31 of the slide chassis 30 is in fact common for all existing AV systems.

SUMMARY OF THE INVENTION

It is, therefore, an object of the present invention to provide a reinforced slide chassis structure of an audio/video system for a vehicle to prevent deteriorations in the slide chassis by reinforcing a deformation-sensitive part of the slide chassis while maintaining a thickness of the entire slide chassis, whereby a weak long hole area can be reinforced and the weight of the whole of the slide chassis can be reduced.

Another object of the present invention is to provide a reinforced slide chassis structure of an audio/video system for a vehicle, which is easy to guide and assemble.

To achieve the above object, there is provided a reinforced slide chassis structure of an AV system for a motor vehicle with a tiltable monitor disposed at a front surface of a main chassis, the reinforced slide chassis structure including: a low-surface chassis disposed at a lower end of the main chassis; and a slide chassis mounted on the low-surface chassis, moving a lower side of the monitor back and forth, wherein at least one reinforcing bracket is mounted on the slide chassis.

Also, the reinforcing bracket is formed along with a long hole formed on the slide chassis.

According to the above structure, the thickness of the entire slide chassis can be maintained, and only the relatively weak long hole area is reinforced.

In this manner, it is possible to reduce the weight of the entire slide chassis, while preventing deteriorations in the slide chassis by reinforcing a deformation-sensitive portion out of the slide chassis.

Besides, drilling an assembly hole into the reinforcing bracket, a driver can change diverse parts more easily ad conveniently, simply by inserting a tool to the assembly hole to loosen or fasten a blot of a guide shaft. Since the reinforcing bracket needs not to be separated from the slide chassis, the convenience and assembability are improved.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view of a related art AV system with a monitor tilting apparatus;

FIG. 2 is a perspective view of the monitor in FIG. 1, in which the monitor is being tilted;

FIG. 3 is a perspective view of a low-surface chassis of FIG. 2;

FIG. 4 is a cross-sectional view taken along line A—A in FIG. 3;

FIG. 5 is a cross-sectional view taken along line B—B in FIG. 3;

FIG. 6 is a perspective view of a driving assembly in an AV system according to a preferred embodiment of the present invention;

FIG. 7 is an enlarged side view of a motor part and a back-and-forth motion member in FIG. 6; and FIG. 8 is a cross-sectional view taken along with line C—C in FIG. 7.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 6 is a perspective view of a driving assembly in an AV system according to a preferred embodiment of the present invention, FIG. 7 is an enlarged side view of a motor part and a back-and-forth motion member in FIG. 6, and FIG. 8 is a cross-sectional view taken along with line C—C in FIG. 7.

As depicted in FIG. 6, the driving assembly for a vehicle AV system having a tiltable monitor disposed at a front surface of a main body of the AV system includes a low-surface chassis 200 positioned at a lower end of the main chassis 100, and a slide chassis 300 mounted on the low-surface chassis 200, for moving a lower side of the monitor (not shown) back and forth.

As mentioned before, the monitor (not shown) is disposed at the front surface of the main body 100, and a main printed circuit board 110 is housed in the main body 100.

One thing to be aware of in FIG. 6 is that to show inside of the main body 100, the front surface 100a of the main body 110 is upside down in the drawing.

The main printed circuit board 100 has diverse parts for controlling a motor part 500, and a cable 130 connected to a connector 150.

Also, a plurality of guide shafts 210 are fixed in the right and left sides of the low-surface chassis 200.

As FIG. 8 illustrates, a fastening hole (not shown) to which a bolt 270 is inserted is formed on a top end of the respective guide shafts 210, and guide rollers 230 for guiding the slide chassis 300 are installed, centering around the guide shafts 210.

On the slide chassis 300 is a long hole 310 to which guide rollers 230 are inserted, enabling the slide chassis 300 to move back and forth.

As such, guide rollers 230 of the guide shafts 210 fasted onto the low-surface chassis 200 are inserted to the long hole 310 of the slide chassis 300, and thus, the guide shafts 210 are protruded to the long hole 310. A washer 250 is mounted on the respective guide shafts 210, to inhibit the guide roller 230 from derailing, and then the bolt 270 is inserted to the fastening hole of the guide shaft 210.

Both ends of the slide chassis 300 are monitor mounting parts 380 on which the lower end of the monitor is placed.

A long hole 350 is formed on a central portion of the slide chassis 300 in such a manner that the motor part 500 and the back-and-forth motion member 600 can be mounted on the low-surface chassis 200.

As illustrated in FIG. 7, the motor part 500 includes a motor 530, a printed circuit board 400 attached to one end of the motor 530, and a worm 550 attached to the other end of the motor 530, transferring power from the motor 530 to the back-and-forth motion member 600.

Specifically, the printed circuit board 400 is fastened on the low-surface chassis 200, and the motor 530 is attached to the printed circuit board 400. One side of the printed circuit board 400 is a connector 510.

The worm 500 is attached to a motor shaft 530a, and it rotates as the motor 530 starts driving.

In the meantime, there is a bracket 410 attached to the motor 530, to support the low surface of the motor 530 and the motor shaft 530a. Thanks to this bracket 410, the motor 530 is more firmly fastened on the printed circuit board 400.

The back-and-forth motion member 600 includes a wormwheel 610, which is engaged with a worm 550, and a wheel 630, one end thereof being engaged with the wormwheel 610 and the other end being engaged with the slide chassis 300.

More specifically speaking, the wormwheel 610 constitutes a head 613 and a body 615, each having gear teeth. And, a shaft at the center of the wormwheel 610 is mounted on the low-surface chassis 200.

Similar to the wormwheel 610, the wheel also constitutes a head 633 and a body 635, each having gear teeth. And, a shaft at the center of the wheel 630 is mounted on the low-surface chassis 200.

The head 633 of the wheel is engaged with the body 615 of the wormwheel 610.

The body 635 of the wheel is engaged with a rack gear part 370 that is formed on the slide chassis 300 in a direction of the slide chassis' motion.

Preferably, a "⊏"-shaped reinforcing bracket 390 is formed along the long hole 310 formed on the slide chassis 300. This reinforcing bracket 390 is fastened onto the slide chassis by means of a plurality of fastening means 390a, e.g. bolts.

Also, an assembly hole 391 can be drilled into the reinforcing bracket 390, particularly where the guide shafts 210 are mounted.

An operation of the embodiment having the above structure is now discussed below.

As for tilting the monitor, a vehicle driver presses a switch to drive the motor part 500. Then the wormwheel 610 of the motor 530 starts rotating, and the wormwheel 610 being perpendicularly meshed (or engaged) with the wheel 630 starts rotating. Since this wormwheel 610 is engaged with the wheel 630, the wheel 630 also starts rotating. At this time, because the wheel 630 has a larger diameter than that of the wormwheel 610, it plays as a reduction gear, reducing the speed.

To be short, as the wheel 630 rotates, the rack gear part 370 of the slide chassis 300 being engaged with the wheel 630 makes a straight-line motion to the front, and thus, the slide chassis 300 moves forward.

On the other hand, if the driver presses the switch one more time, the motor shaft 530 rotates in a reverse direction, and the wormwheel 610 also rotates in a reverse direction of the above. As a result, the wormwheel 610 and the wheel 630 rotate in a reverse direction of the above, and the rack gear part 370 of the slide chassis 300 moves backward.

At this time, the guide roller 230 of the guide shaft 210 fastened onto the low-surface chassis 200 acts as a guide for guiding the back-and-forth motion of the slide chassis 300.

With an application of the reinforcing bracket 390 to the slide chassis 300 moving along the long hole, the relatively weak long hole area out of the slide chassis 300 can be strengthened.

That is to say, without changing the thickness, i.e. approximately 0.8 mm, of the entire slide chassis 300, it is possible to reinforce the relatively weak long hole area 310.

In this manner, deteriorations in the slide chassis 300 can be prevented by reducing a total weight of the slide chassis 300 yet reinforcing the deformation-sensitive portion.

Moreover, if the assembly hole 391 is drilled into a position where the guide shaft 210 of the reinforcing bracket 390 is supposed to be attached, the driver can easily change the washer 250, the guide shafts 210 and the guide rollers 230 and so forth, by inserting a tool to the assembly hole 391 to loose or fasten a bolt. Overall, drivers can easily change parts with new ones, not necessarily separating the reinforcing bracket 390 from the slide chassis 300.

In conclusion, the reinforced slide chassis structure of an AV system for the vehicle has the following advantages.

First, since the reinforcing bracket is installed along the long hole of the slide chassis, the relatively weak long hole area can be strengthened, while the thickness of the entire slide chassis being maintained.

Therefore, deteriorations in the slide chassis can be prevented by reducing a total weight of the slide chassis yet reinforcing the deformation-sensitive portion.

Second, drilling the assembly hole into where the guide shaft of the reinforcing bracket is supposed to be attached, the driver can easily change the washer, the guide shafts and the guide rollers and so forth, simply by inserting a tool to the assembly hole to loose or fasten a bolt. Overall, drivers can easily change diverse parts with new ones, not necessarily separating the reinforcing bracket from the slide chassis, and as a result, the convenience and assembability of the invention can be improved.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A reinforced slide chassis structure of an AV system for a motor vehicle having a tiltable monitor disposed at a front surface of a main body of the AV system, the reinforced slide chassis structure comprising:
   a low-surface chassis disposed at a lower end of the main body;
   a slide chassis mounted on the low-surface chassis, to permit movement of a lower side of the monitor back and forth; and
   a plurality of reinforcing brackets provided on the slide chassis adjacent a plurality of elongated holes formed along sides on the slide chassis.
   wherein a cross section of each reinforcing bracket is generally "U"-shaped.

2. The reinforced slide chassis structure of the AV system according to claim 1, wherein an assembly hole is drilled into the reinforcing bracket.

3. The reinforced slide chassis structure of the AV system according to claim 1, wherein each reinforcing bracket straddles a respective elongated hole.

\* \* \* \* \*